Aug. 1, 1939.   A. L. FREEDLANDER   2,167,942
BELT UNIT
Filed Sept. 30, 1936
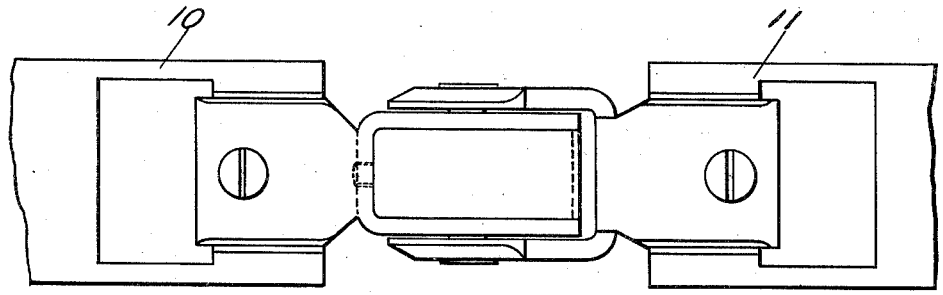
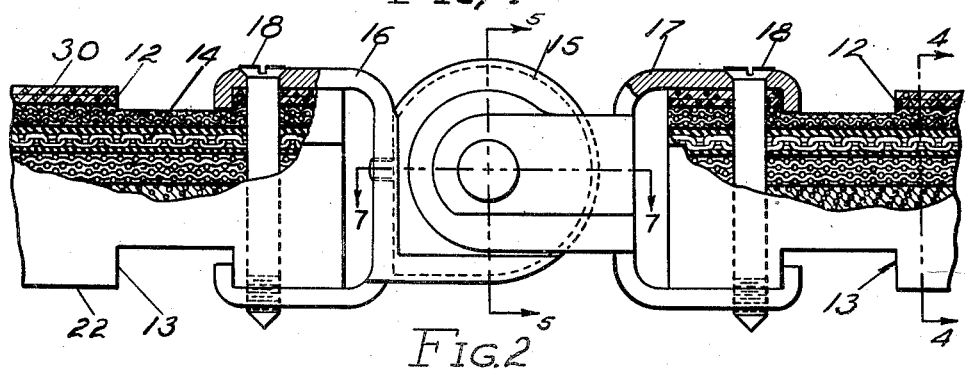
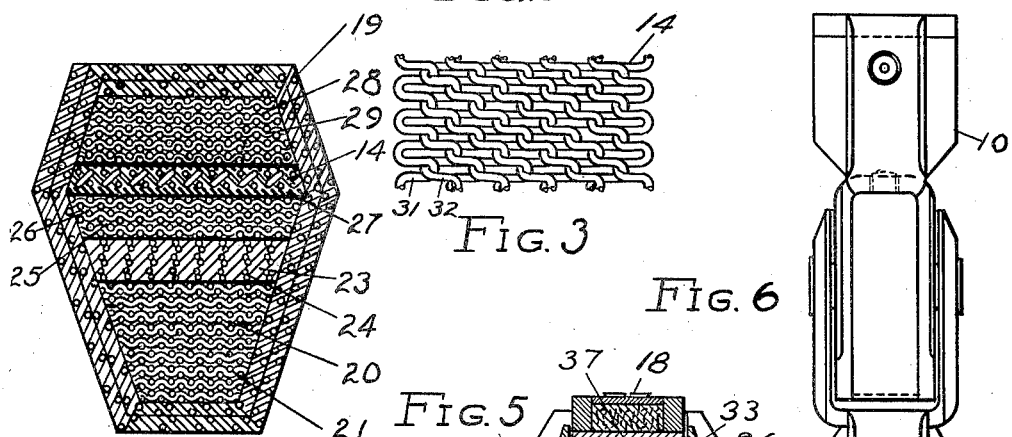
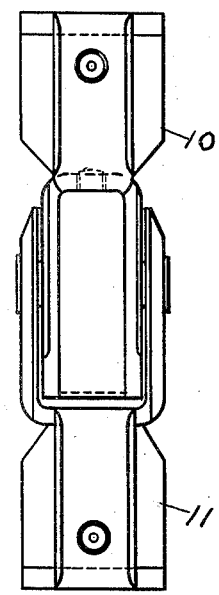
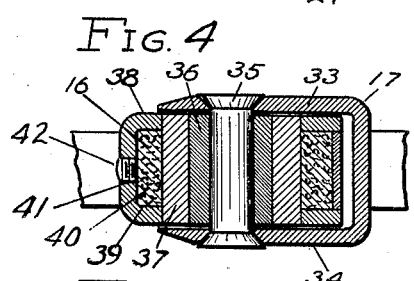
INVENTOR.
ABRAHAM L. FREEDLANDER,
BY
ATTORNEYS Patented Aug. 1, 1939

2,167,942

UNITED STATES PATENT OFFICE 2,167,942

BELT UNIT

Abraham L. Freedlander, Dayton, Ohio, assignor to The Dayton Rubber Manufacturing Company, Dayton, Ohio, a corporation of Ohio Application September 30, 1936, Serial No. 103,418

2 Claims. (Cl. 74—237)

This invention relates to devices for transmitting power, and in particular, to belts.

One object of this invention is to provide a belt unit consisting of a belt having a flexible member of durable material arranged near the neutral axis of the belt, and connected to the belt connector which unites the free ends of the belt.

Another object is to provide a belt unit consisting of a belt with a metal mesh member therein and a belt connector uniting the free ends of the belt and engaging the metal mesh member so as to form a flexible but substantially inextensible unit.

Another object is to provide a belt unit for transmitting power, wherein the belt consists of tension and compression portons with a metal mesh member extending longitudinally through the belt in the neighborhood of the neutral axis, the free ends of the belt being interconnected by a belt connector having anchor members, such as screws, passing through the metal mesh member so as to provide a substantially unbroken, inextensible connection extending entirely around the belt.

In the drawing:

Figure 1 is a top plan view of a portion of the belt unit of this invention, showing a belt connector interconnecting the free ends of the belt.

Figure 2 is a side elevation, partly in section, of the belt unit shown in Figure 1.

Figure 3 is a top plan view of a portion of the metal mesh member shown in vertical section in Figure 2.

Figure 4 is a cross section through the belt unit taken along the line 4—4 of Figure 2.

Figure 5 is a vertical section through the belt unit taken along the line 5—5 of Figure 2.

Figure 6 is a bottom plan view of the belt unit shown in Figure 1.

Figure 7 is a horizontal section through the belt unit shown in Figure 2 taken along the line 7—7 thereof.

In general, the belt unit of this invention consists of a belt of resilient material having a longitudinal flexible member of durable and substantially inextensible material, arranged at or near the neutral axis of the belt, the free ends of the belt being interconnected by a belt connector having anchorage devices passing through the longitudinal member. In this manner the belt unit is rendered substantially inextensible throughout its entire extent in the vicinity of the neutral axis because the longitudinal member is substantially inextensible and the belt connector is also inextensible, these members being joined by the anchorage means for anchoring the belt connector to the free ends of the belt.

In particular, a flexible metal mesh band is arranged in the belt near its neutral axis, and the clamp screws of the belt connector are caused to pass through and engage this metal mesh member in such a manner that the belt connector serves not only to interconnect the ends of the belt, but also to interconnect the free ends of the substantially inextensible metal mesh member. Ordinarily, belts composed merely of rubber, with or without fabric or cord elements therein, in time become extended along their neutral axes, thereby lengthening the belt and requiring a corresponding adjustment in the pulleys which the belt is intended to connect. The present invention maintains the belt in a substantially inextensible condition, yet provides complete flexibility so that the pulleys will require no adjustment over extremely long periods of time other than for the slight wear which inevitably occurs upon the belt surfaces.

Referring to the drawing in detail, Figures 1 to 7, inclusive, show a preferred embodiment of the present invention as consisting of a belt of hexagonal cross section, having free ends 10 and 11 with upper and lower notches 12 and 13 formed therein. Arranged within the belt at substantially the neutral axis position thereof, as shown in Figures 2 and 4, is a substantially inextensible member 14, shown as a metal mesh member, which forms a band extending longitudinally through the belt. This metal mesh member is shown more in detail in Figure 3. The hexagonal belt in connection with which the invention is disclosed herein is obviously merely one form of belt to which the principles of the invention may be applied. Other forms of belts, such as rectangular, triangular, pentagonal or round cross section may obviously be employed, with the flexible longitudinal member or metal mesh band disclosed herein.

The free ends 10 and 11 are interconnected by a belt connector, generally designated 15, and having clamps 16 and 17 secured to the free ends 10 and 11 by means of clamp screws 18. The clamp screws 18 pass entirely through the belt and also through the metal mesh member 14, thereby creating a substantially inextensible endless connection in the vicinity of the neutral axis of the belt. The metal mesh band 14 is substantially inextensible and the belt connector 15 is likewise substantially inextensible, the two being joined to form a unit by means of the clamp screws 18 passing through the mesh member 14, as shown in Figure 2.

The invention is obviously not limited to the use of the belt connector shown in the drawing, this being merely one form of belt connector which may be employed. It is evident that any suitable form of belt connector may be used so long as it provides a substantially inextensible connection and anchorage to the free ends of the belt containing the flexible longitudinal member 14, here shown as a metal mesh member.

In Figure 4 is shown an enlarged cross sectional view of a hexagonal rubber and fabric belt employing the metal mesh member 14. This belt consists of an outer wrapper 19 which surrounds the core of the belt. The core of the belt is provided with a cog portion 20 along the lower portion thereof, this being formed of rubber having textile insertions 21 arranged therein. The cog portion 20 of the belt contains the lower notches 13 and lower cogs 22 formed in the belt. Above the cog portion 20 in the belt core is a compression portion 23, preferably consisting of rubber having bias laid textile insertions 24 incorporated therewith. Immediately above this is a portion 25 of rubber having straight laid textile insertions 26 incorporated therewith. Above the portion 25 and in close proximity to the neutral axis of the belt is the flexible longitudinal member 14, previously mentioned, and shown in the present embodiment as a metal mesh band. This metal mesh band is preferred because the rubber of the rubber portion 27 associated therewith may enter the interstices of the mesh in such a manner as to form a substantially integral unit. It will be obvious, however, that a metal band with apertures therein would accomplish an analogous result, hence, the invention is not limited to the employment of the metal mesh band.

Located above the metal mesh member 14 and its rubber component 27 is the tension portion 28 of the belt core. This is composed of rubber having straight laid textile insertions 29 incorporated therewith. The upper cogs 30 and notches 12 are formed in this tension portion 28. In Figures 2 and 4 the rubber component associated with the metal mesh member 14 is shown in heavy black cross section lines in order to emphasize more clearly the nature of the construction, and to distinguish from the adjacent portions of the belt, which are also of rubber. One form of the metal mesh member 14 is shown in Figure 3 and consists of alternate metal wires or strands 31 and 32, which are arranged in undulating or serpentine form so as to interlock with one another in the manner of links in a chain. In this way the metal mesh member 14 is provided with substantial inextensibility in a longitudinal direction, yet with flexibility in a transverse direction, together with substantial freedom from restraint.

The belt connector itself may consist of any suitable type, the type shown being merely for purposes of illustration. In the belt connector shown the clamp member 17 is provided with forwardly extending arms 33 and 34, interconnected by a rivetlike member 35. The latter is surrounded by a bearing member 36 (Figures 5 and 7), and this in turn, is surrounded by a bearing bushing 37. The bearing bushing 36 is preferably of hardened steel, or some equivalent material, and the bearing bushing 37 may be of bronze or of a self-lubricating material, such as is known to those skilled in the art.

The bearing bushing 37 is mounted in the forwardly extending hollow portion 38 on the belt clamp 16, this having a hollow chamber 39 containing a fibrous material 40. The latter may be soaked with lubricant through the aperture 41 by removing the threaded plug 42 therefrom. In this manner the opposite portions 16 and 17 of the belt connector are adapted to flex relatively to one another around the axis of the rivet-like member 35 and bearing member 36, yet are kept constantly lubricated so as to maintain this ease of flexion. The belt connector 15, however, is substantially inextensible and the flexible metal member 14, such as the metal mesh member shown with the interlocking strands 31 and 32, is also substantially inextensible, and these are joined to one another through the agency of the clamp screws 18 passing through the metal mesh member 14. In this manner a substantially inextensible connection is provided throughout the complete circuit of the belt, thereby maintaining it in a flexible yet substantially inextensible condition.

The belt per se, containing the flexible metal mesh member, is disclosed and claimed in the copending application of Abraham L. Freedlander, Ser. No. 102,968, filed September 28, 1936.

It will be understood that I desire to comprehend within my invention such modifications as come within the scope of the claims and the invention.

Having thus fully described my invention, what I claim as new and desire to secure by Letters Patent is:

1. A belt unit comprising an elongated resilient body with inclined side walls and of a thickness relatively large in proportion to its width having a lower portion of rubber and textile insertions, a compression layer of rubber and textile insertions above said portion, a layer of rubber with straight laid textile insertions above said compression layer, a flexible longitudinal inextensible band of metal-like material with multiple rows of interengaging links near the neutral axis of the belt, a tension portion of rubber having textile insertions therein above said band, an outer wrapper surrounding said parts of the belt, a belt connector joining the free ends of the linked band, and clamping members secured to said connector and passing through the free ends of the elongated body and said flexible band to join said flexible band to said belt connector.

2. A belt unit comprising an elongated resilient body with inclined side walls and of a thickness relatively large in proportion to its width having a lower portion of rubber and textile insertions, a compression layer of rubber and bias textile insertions above said portion, a layer of rubber with straight laid textile insertions above said compression layer, a flexible longitudinal inextensible band of metal-like material with multiple rows of interengaging links near the neutral axis of the belt, a tension portion of rubber having straight laid textile insertions therein above said band, and an outer wrapper surrounding said parts of the belt.

ABRAHAM L. FREEDLANDER.